United States Patent Office — 3,411,871, Patented Nov. 19, 1968

3,411,871
PROCESS FOR FORMING ACTIVE CUPROUS HALIDE SORBENTS
Werner Albert Bauch and Jack Whitfield Burt, Baton Rouge, La., and Warren Alfred Knarr, Ponca City, Okla., assignors to Esso Research and Engineering Company, a corporation of Delaware
No Drawing. Filed June 8, 1965, Ser. No. 462,431
15 Claims. (Cl. 23—97)

---

ABSTRACT OF THE DISCLOSURE

This invention relates to improvements in the preparation of highly porous activated cuprous halide sorbent particles for use in the separation of ligands, e.g., butadiene, via complexation techniques. Highly porous sorbent particles are prepared from the corresponding cuprous halide salts by dissolving the latter in olefinic solvents, filtering to remove fines, especially those particles of size smaller than about 0.15 micron, and then contacting the sorbent with a suitable ligand to form an insoluble complex. The ligand addition rate is controlled at from about 0.0001 to 0.1 gram of the ligand/minute/gram of dissolved cuprous halide salt to suppress reformation of fines. The insoluble complex is thermally decomplexed to provide recovery of active sorbent particles which can then be used for the separation and recovery of ligands from admixture with hydrocarbon streams.

---

The activated cuprous halide sorbent particles thus prepared are strong, porous and well suited for use in fluidized bed processes for separating and recovering olefins from hydrocarbon streams containing them. These porous activated cuprous halide sorbents are especially well suited for vapor phase, fluidized bed olefin separation and recovery processes.

The terms "sorbent," "sorbing," "sorb," and similar terms as used herein are employed to include both absorption and adsorption as it is believed that both types of phenomena are involved in selective recovery of olefins. The term "ligand" as employed herein with respect to the complexing agent used is intended to denote the presence of a complexing agent containing a functional group capable of forming stable copper complexes having a mole ratio of copper to complexing moiety greater than 1:1. Preferably a complexing agent is employed which forms a stable complex having a mole ratio of copper to complexing moiety of 2:1 and higher.

Such compounds include both materials which form only complexes having said ratios of copper to complexing compound greater than 1:1 and compounds which form complexes having a ratio of 1:1 or less which upon decomplexing pass through a stable complex having a ratio of copper to complexing compound greater than 1:1. Thus, certain materials, e.g., nitriles, diolefins, acetylenes, carbon monoxide under ordinary conditions forming a 2:1 complex can be made to complex in ratios of copper to complexing compound of 1:1 or less. However, upon dissociation, complexing material is released selectively from the bed of cuprous halide until the stable complex, viz. the complex having a copper to complexing moiety ratio above 1:1, e.g., 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein are carbon monoxide, organic nitriles and HCN, organic compounds having an acetylenic group, i.e., as present in acetylene, and polyolefins, i.e., especially diolefins, e.g., butadiene, isoprene, etc. More than one of these functional groups can be present in a single molecule of the complexing compound. In addition, the complexing compound can contain other functional groups so long as they do not interfere with complex formation.

Suitable cuprous halide salts for use in accordance with this invention include cuprous chloride, cuprous bromide, and cuprous iodide with the preferred cuprous halide salt being cuprous chloride. The purity of the cuprous halide salt should be at least 90%. Usually the purity of the cuprous halide salt ranges from 90 to 100%, and preferably from 97.0 to 100%. The moisture content of the cuprous halide salt at the time it is added to the $C_5$ to $C_{10}$ mono alpha olefin solvent(s) should usually not exceed 1.0 wt. percent and preferably should not exceed about 0.5% (based on dried cuprous halide salt).

A wide variety of organic solvents can be used to dissolve the cuprous halide salt, e.g., $C_4$ to $C_{10}$ monoolefins, esp. $C_4$ to $C_{10}$ mono alpha olefins; refinery hydrocarbon streams containing a predominant portion of monolefins, including Types I, II, III, IV and cyclic olefins, e.g., light fraction from steam cracked naphthas; refinery hydrocarbon streams containing a predominant portion of monocyclic aromatic hydrocarbons, e.g., hydrocarbon raffinate streams, etc. Preferably a solvent is used in which the cuprous halide-ligand complex is insoluble. Suitable exemplary $C_4$ to $C_{10}$ monoolefin solvents include, but are not limited to the following: butene-1, isobutylene, pentene-1, hexene-1, heptene-1, octene-1, nonene-1, decene-1, and mixtures of any two or more of the above monoolefins with or without such optional hydrocarbon diluents as paraffins, cycloparaffins, cycloolefins, conjugated multiolefins, etc. While conjugated multiolefins, e.g. conjugated diolefins can be tolerated in small amounts, the concentration thereof should usually be $<1.0$ wt. percent and preferably $<$about 0.5 wt. percent (based on total solvent).

As mentioned above, refinery olefinc hydrocarbon streams predominating in cyclic olefins or even monocyclic aromatics can be used as solvents for the cuprous halide salts. Such refinery streams can have the following components in the below indicated concentrations:

| Components | Concentrations (Wt. percent) | |
|---|---|---|
|  | Characteristic | Usual |
| Type I Olefins | 10 to 40 | 15 to 30. |
| Type II (cis) Olefins | 1 to 25 | 2 to 20. |
| Type II (trans) Olefins | 1 to 25 | 2 to 20. |
| Type III Olefins | 0.5 to 40 | 1 to 30. |
| Type IV Olefins | 0.05 to 40 | 0.1 to 35. |
| Cyclic Olefins | 0 to 70 | 0 to 65. |
| Monocyclic Aromatics (usually benzene and/or toluene) | 0.5 to 70 | 1 to 70. |
| Paraffins | 0 to 10 | 0 to 8. |
| Multiolefins | 0 to 8 | 0 to 7. |

Before the cuprous halide salt is added to the solvent, the solution is usually cooled, e.g., to temperatures ranging from about $-40$ to $40°$ F., usually $-25$ to $25°$ F. and more preferably $-10$ to $10°$ F. The cuprous halide salt is then added gradually thereto with agitation, e.g., stirring, to aid in dissolving.

After the cuprous halide salt has been dissolved to form cuprous halide solutions containing from about 2 to 25 wt. percent, usually 2 to 20 wt. percent and preferably 4 to 15 wt. percent cuprous halide salt dissolved therein; the cuprous halide solution is carefully treated to separate and thereby remove insoluble fines (residues, undissoved salt, etc.), having a particle size less than $\sim 0.15$ micron ($\mu$). This separation treatment to remove these $<\sim 0.15\mu$ particles is essential, and it must be performed prior to complexation of the dissolved cuprous halide salt with the gaseous complexing agent (ligand). If these $<0.15\mu$ size insolubles are not removed before complexation, they lead to the production of disproportionately large concentration of undesired fines ($<20\mu$) particles in the complexing step and resulting active sorbents, perhaps by serving as fines nuclei during the complexing step. Such a catalytic disproportionate production of complex particle fines, viz. cuprous halide-ligand complex particles having a particle size less than about $20\mu$ is to be carefully avoided as these materials: result in the formation of poor quality active halide sorbents; elutriate rapidly from fluidized beds; have poor attrition resistance reduced sorptive capacity, etc. The separation is conveniently accomplished by filtration using a microporous $<20\mu$ size filter, e.g., a $10\mu$ or smaller filter, precoating with diatomaceous earth, insoluble cuprous halide salt residue, etc. The temperature is usualy maintained at from $-25$ to $25°$ F. during filtration, but the temperature can vary considerably depending upon the solubility range of the solvent employed. Other separation procedures, e.g., settling in settling tanks, centrifugation, etc., can be used in place of or in addition to the above mentioned filtration to separate out the $<0.15\mu$ insolubles.

After thus clarifying the cuprous halide solution, the clarified solution is contacted with a suitable gaseous ligand, e.g., butadiene gas, by bubbling the gaseous ligand into the filtered solution to effect complex formation. The complex formed is insoluble in the solvent used, and precipitates out readily. Complexing is usually conducted at $-25$ to $25°$ F. and preferably at $-10$ to $10°$ F. for a sufficient time to precipitate out substantially all of the cuprous halide salt as the insoluble cuprous halide-ligand complex. Mild agitation is usually used, e.g., stirring, to insure adequate uniform contact of dissolved salt and gaseous ligand, but usually the agitation does not exceed $2\times 10^{-3}$ horsepower/gallon.

An essential feature of the complexing step is that the rate of addition of the gaseous complexing agent, e.g., butadiene, must be gradual enough to avoid incipient precipitation of fines. To insure proper complexation therefore, the butadiene (or other suitable gaseous complexing agent) is added uniformly at a rate of 0.0001 to about 0.1 gram butadiene per minute per gram of dissolved cuprous halide salt. Butadiene addition rates substantially in excess of about 0.1 g./min./g. lead to the production of sorbent particles of poor quality whereas at rates significantly below 0.0001 g./min./g. the time required for production is unduly extended without gain in product quality. Usually the rate at which the complexing agent is added ranges from about 0.001 to about 0.09 gram/minute/gram of dissolved cuprous halide salt and preferably from about 0.001 to about 0.05 g./minute/g. dissolved cuprous halide salt. Since the cuprous halide-ligand complex is insoluble, e.g., cuprous chloride-butadiene, in the solvent used to prepare the cuprous halide solution; the complex precipitates out and can easily be recovered by conventional means, e.g. filtration, centrifugation, settling, etc.

Following recovery of the cuprous halide-ligand complex, the complex is thermally decomplexed to prepare the activated cuprous halide sorbent particles by subjecting the complex particles to conditions of temperature and pressure such that the dissociation pressure of the complex exceeds the partial pressure of the complexed ligand. Consequently, the complex decomposes with release of the ligand.

This decomplexing is usually accomplished in the following manner. The complex, as a wet cake from the filter-separator, is collected in a suitable vessel. Stripping gas is admitted to the bottom of the vessel. Heat is applied to the vessel and/or the stripping gas, which promotes drying of the complex. As the free liquid solvent is removed, the granular complex loses its cake form and the discrete particles readily fluidize. Decomplexing to form the activated cuprous halide sorbent is then accomplished by heating as noted above. Typical decomplexation conditions are 0.3 ft./sec. superficial vessel stripping gas velocity and 170 to 190° F. vessel temperature at atmospheric pressure.

The activated cuprous halide sorbent particles prepared according to this invention are porous and have a characteristic porosity of at least 10% (of the total volume of a particle) 550 to 10,000 A. pores, as determined by mercury porosimeter measurements. The bulk density of these active sorbent particles characteristically ranges from about 60 to about 90 pounds per cubic foot (loose) and about 65 to about 97 lbs./ft.$^3$ (compacted). The average particle size diameter of said active cuprous halide sorbents characteristically ranges from 50 to 100+ microns.

The olefin separation and recovery procedures employing the above-described active cuprous halide sorbents is conducted readily by contacting the active sorbent, e.g., in the form of a fixed or fluidized bed, with a gaseous or liquid hydrocarbon stream containing the ligand, e.g., diolefin, to be separated therefrom. The ligand is absorbed (complexed) on the cuprous halide particles. The separated ligand is then recovered from the loaded sorbent by heating, i.e., subjecting the loaded sorbent to conditions of temperature and pressure such that the dissociation pressure of the sorbent-ligand complex exceeds the partial pressure of the sorbed olefin. Consequently the complex decomposes with release of the sorbed olefin, which is then collected by conventional means.

In accordance with this invention, it has been observed that the active sorbent particles produced according to the present invention can remove essentially all, e.g., 95+% of the butadiene present in hydrocarbon streams containing butadiene in concentrations ranging as low as about 15 wt. percent (based on total hydrocarbon stream) and even lower. Of course, these sorbents likewise selectively sorb and therefore remove butadiene and other complexing ligands from hydrocarbon streams containing less than 15 wt. percent thereof. Moreover, these active sorbents can be employed to sorb selectively other compounds, organic and inorganic, containing ligands capable of complexing therewith, e.g., ammonia; carbon monoxide; HCN; $C_2$ to $C_{20}$ monoolefins, e.g., ethylene, propylene, etc.; $C_3$ to $C_{20}$ diolefins, e.g., allene; $C_4$ to $C_{20}$ conjugated diolefins, e.g., isoprene, etc.; from mixtures (streams) containing them.

This invention will be illustrated in further detail by the following examples.

EXAMPLE 1

Fifteen (15) gallons of commercial grade isobutylene solvent were placed in a glass lined vessel provided with a centrally located agitator, and chilled to 0° F. Then six (6) pounds of commercial cuprous chloride salt (98% of particles less than $100\mu$) were added thereto, and the mixture was stirred for 60 minutes.

Then the cuprous halide solution was filtered to remove insolubles using a "Cuno" 10 micron fiber filter precoated with raw cuprous chloride undissolved salt (insolubles) obtained from previous runs by pumping around through the filter and back to the dissolving tank repeatedly.

Following this filtration step the filtered cuprous chloride solution still maintained at 0° F. was pumped to another (precipitation=complexing) vessel where sufficient gaseous commercial grade butadiene to equal one stoichiometric amount was pumped in at the gradual uniform addition rates noted below over approximately 0.7 to 2 hour periods. The pertinent data are tabulated below in Table 1. The precipitated solids were filtered, dried, decomplexed at 170 to 190° F. and graded for particle size range.

TABLE 1

| Run Number | 1 | 2 | 3 | 4 | 5 |
|---|---|---|---|---|---|
| Butadiene Addition: | | | | | |
| Time (Hours) | 0.7 | 1.16 | 1.25 | 1.98 | 2.0 |
| Rate (g. $C_4^{--}$/min./g. dissolved CuCl) | 0.0078 | 0.9144 | 0.00357 | 0.0101 | 0.00223 |
| Particle Size, Microns: | Weight, percent | | | | |
| 0–20 | 3.0 | 0.06 | 3.0 | 0.56 | 2.0 |
| 20–50 | 10.0 | 2.5 | 7.0 | 3.4 | 3.0 |
| 50–75 | | 92.8 | | 52.14 | |
| 50–80 | 84.0 | | 1.0 | | 2.0 |
| 75–120 | | 3.8 | | 20.17 | |
| 80–110 | 2.0 | | 9.0 | | 2.0 |
| 100+ | | 1.4 | | 23.73 | |
| 110+ | 1.0 | | 79.0 | | 91.0 |

Each of Runs 1–5 produced acceptable cuprous halide sorbent at butadiene addition rates of 0.002 to 0.014 which are well within the preferred butadiene addition rate range of 0.001 to 0.05 g./min./g. of dissolved CuCl salt. Usually a sorbent acceptable for use in fluidized beds contains a combination of <10 wt. percent of <20$\mu$ particles coupled with >about 75 wt. percent of 50+$\mu$ particles. Ideally for fluidization the sorbent particles would have a fairly even weight distribution of particle sizes within the 50 to 75 (or 80) microns, 75 to 100 (or 120) microns and 100+ (or 110+) microns size ranges. Thus while the sorbents from Runs 1–5 are acceptable, Run 4 produced the best particles for fluidization.

EXAMPLE 2

The procedure of Example 1 was repeated with the exception that the active sorbent particles from Run 6 were formed from unfiltered cuprous chloride solutions whereas the sorbent particles of Run 7 were formed from a cuprous chloride solution which was filtered in accordance with Example 1. Essentially the same butadiene addition rates were used in Runs 6 and 7, and gaseous butadiene was used in each run. The pertinent data are tabulated below in Table 2.

TABLE 2

| Run Number | 6 | 7 |
|---|---|---|
| Filtered | No | Yes |
| Time Required for $C_4^{--}$ Addition (Hrs.) | 2 | 1.98 |
| | Weight, percent | |
| Particle Size ($\mu$): | | |
| 0–6 | 1.15 | 0.00 |
| 6–20 | 3.95 | 0.20 |
| 20–50 | 65.61 | 0.37 |
| 50–75 | 21.00 | 0.95 |
| 75–120 | 2.64 | 0.95 |
| 100+ | 5.65 | 97.54 |

This example clearly shows the benefits of filtering the cuprous chloride solutions before complexation of cuprous chloride with butadiene. The particles produced in Run 7 are greatly superior to those produced in Run 6, which were formed from unfiltered cuprous chloride solutions.

EXAMPLE 3

The procedure of Example 1 was repeated except that the butadiene was added as a liquid in Runs 8 and 9, and as a gas in Runs 10 and 11. The butadiene addition periods and rates were also varied as noted in Table 3 below.

TABLE 3

| Run Number | 8 | 9* | 10 | 11 |
|---|---|---|---|---|
| $C_4^{--}$ Addition: | | | | |
| Phase | Liquid | Liquid | Gaseous | Gaseous |
| Time (Hours) | 0.3 | 1.0 | 1.5 | 1.5 |
| Rate (g./min./g.) | 0.085 | 0.0275 | 0.0100 | 0.0101 |
| | Weight, percent | | | |
| Particle Size ($\mu$): | | | | |
| 0–10 | 16.2 | 0.0 | 0.0 | 0.4 |
| 6–20 | 8.3 | 5.2 | 0.1 | 0.1 |
| 20–50 | 10.4 | 9.7 | 1.1 | 3.4 |
| 50–75 | 3.4 | 5.0 | 6.3 | 52.1 |
| 75–120 | 2.6 | 0.9 | 11.1 | 20.2 |
| 100+ | 59.1 | 79.0 | 81.3 | 23.7 |

*Particles agglomerated badly; fines stuck together.

This example illustrates the benefits attained by using gaseous butadiene to complex the cuprous halide salt. Both slow (1 hour) and fast (0.3 hour) liquid butadiene addition produced poor quality sorbent. Although the butadiene addition in neither liquid butadiene addition run was done as slow as either gaseous addition run, additional experiments showed that longer addition times would not materially improve the particle size and sorbent quality obtained when adding butadiene as a liquid.

EXAMPLE 4

The procedure of Example 1 was repeated except that in Runs 12 and 13 the 10$\mu$ filter was not precoated with undissolved cuprous chloride salt whereas in Runs 14 and 15, it was precoated with undissolved cuprous chloride salt. The precoating was conducted by pumping around cuprous chloride solutions containing undissolved cuprous chloride salt through the filter and back to the dissolver thus precoating the filter cartridge with undissolved cuprous chloride insolubles.

The pertinent data are tabulated in Table 4 below.

TABLE 4

| Run Number | 12 | 13 | 14 | 15 |
|---|---|---|---|---|
| Filtered | Yes | Yes | Yes | Yes |
| Filter Precoat | No | No | Yes | Yes |
| | Weight, percent | | | |
| Particle Size ($\mu$): | | | | |
| 0–20 | 25.3 | 29.3 | 0.3 | 0.3 |
| 20–50 | 17.5 | 40.6 | 1.7 | 2.2 |
| 50–80 | 46.8 | 25.5 | 40.0 | 27.5 |
| 80–110 | 2.5 | 1.9 | 41.0 | 34.5 |
| 110+ | 7.9 | 2.7 | 17.0 | 35.6 |

As will be noted from Table 4, the cuprous chloride sorbent particles produced in Runs 14 and 15 (Filter Precoat) have a highly satisfactory particle size distribution (>95 wt. percent of 50$\mu$+ particles) whereas the sorbent particles secured from Runs 12 and 13 are unsatisfactory.

The filtered cuprous chloride solutions of Runs 12 to 15 were examined visually prior to complexing. The solutions from Runs 14 and 15 were clear to the naked eye whereas those from Runs 12 and 13 visibly showed suspended particulate matter.

Additional tests were conducted using 0.15$\mu$ filters precoated with undissolved cuprous chloride and unprecoated. Visual examination of the unprecoated filtered solutions showed suspended particulate matter whereas the precoated did not. The unprecoated filtered solutions led to formation of unsatisfactory sorbent whereas the precoated filtered solutions led to highly satisfactory sorbent. Thus apparently a major portion of the suspended solids are at least smaller than 0.15$\mu$; and these are effectively removed by precoat filtration.

According to one of the embodiments of this invention, the solvent used to dissolve the cuprous halide salt is recycled from the complexing vessel to the dissolving tank for reuse in dissolving more cuprous halide salt. Before passing the solvent back to the dissolving tank, however, the solvent is filtered (preferably using a <20 micron filter precoated with cuprous halide insolubles) to remove complex fines, esp. those having a particle size <0.15 micron. Other separation procedures can be used to accomplish this purpose either in addition to, or in place of, the abovementioned filtration.

In accordance with another, but less preferred, embodiment of this invention an inert gas, e.g., nitrogen, can be used as a diluent in introducing the gaseous butadiene during the complexing step. Experimental work has shown that gaseous butadiene without nitrogen has a beneficial effect since the sorbent particles are harder than when a gaseous mixture of butadiene and nitrogen is employed. Dilution of the gaseous butadiene with nitrogen does not have a detrimental effect on sorbent particle size, however.

While the above examples illustrate the present invention in great detail, it should be understood that the present invention in its broadest aspects is not necessarily limited to the specific materials and conditions set forth therein.

What is claimed is:

1. In a process for preparing cuprous halide sorbents from the corresponding cuprous halide salts wherein the cuprous halide salt is first dissolved in a solvent to form a solution and then complexed with a complexing agent to form an insoluble complex which is then decomplexed to provide the active sorbent, the improvement comprising forming a clarified solution by separating from said cuprous halide solution at a temperature ranging from about $-40°$ to about $40°$ F., prior to said complexing step, insoluble particles of sizes less than about 0.15 micron, forming said complex having a mole ratio of copper to complexing agent greater than about 1:1 by adding the complexing agent to the clarified solution at a rate ranging from about 0.0001 to 0.1 gram of complexing agent/minute/gram of dissolved cuprous halide, and then activating said complex by subjecting it to conditions of temperature and pressure wherein the dissociation pressure of said complex exceeds the partial pressure of said complexing agent to yield active porous cuprous halide sorbent particles, characterized by a porosity of at least 10 percent (of the total volume of a particle) 550 to 10,000 A. pores.

2. A process as in claim 1 wherein said cuprous halide salt is cuprous chloride.

3. A process as in claim 1 wherein said solvent comprises a $C_4$ to $C_{10}$ monoolefin.

4. A process as in claim 1 wherein said separation step is conducted by filtration using a <20 micron size filter precoated with cuprous halide insolubles.

5. A process as in claim 1 wherein said complexing agent addition rate ranges from 0.001 to 0.09 gram of complexing agent/minute/gram of dissolved cuprous halide salt.

6. A process as in claim 1 wherein said activation temperatures range from about 140 to $212°$ F.

7. A process as in claim 1 wherein said complexing agent is butadiene.

8. A process as in claim 1 wherein said complexing is conducted at temperatures ranging from $-20$ to $20°$ F.

9. An improved process for preparing active cuprous chloride sorbents which comprises dissolving cuprous chloride salt in a $C_4$ to $C_{10}$ monoolefin solvent at about $-10$ to about $10°$ F. to form a cuprous chloride solution; filtering said solution using a $10\mu$ or smaller size filter pre- coated with cuprous chloride residual particles insoluble in said solvent to remove from said solution insoluble particles having a particle size less than about 0.15 micron and form a clarified cuprous halide solution; then introducing gaseous butadiene into contact with said clarified solution at a butadiene addition rate ranging from about 0.001 to 0.05 gram of butadiene/minute/gram of dissolved cuprous halide salt to form an insoluble cuprous chloride-butadiene complex; and, then activating said complex by heating at temperatures of 170 to $190°$ F. to yield active porous cuprous chloride sorbent particles having a combination of <10 wt. percent of <20 micron size particles coupled with >75 wt. percent of 50 micron+ size particles, said active sorbent particles further characterized by a porosity of at least 10% (of the total volume of a particle) 550 to 10,000 A. pores.

10. A process as in claim 9 wherein said clarified solution is agitated during said complexing step at a rate not exceeding about $2 \times 10^{-3}$ horsepower per gallon.

11. A process as in claim 9 wherein said cuprous chloride solution contains from about 2 to about 25 wt. percent cuprous chloride.

12. A process as in claim 9 wherein said complexing is conducted at temperatures ranging from about $-10$ to $10°$ F.

13. A process as in claim 9 which includes recycling solvent from said complexing step to said dissolving step after separating complex and other insoluble particles having a size <about 0.15 micron therefrom.

14. A process as in claim 9 wherein an inert gaseous diluent is mixed with said gaseous butadiene prior to contact with said clarified cuprous chloride solution.

15. A process as in claim 14 wherein said inert gaseous diluent is nitrogen.

References Cited

UNITED STATES PATENTS

| | | | |
|---|---|---|---|
| 2,386,300 | 10/1945 | Drennan et al. | 260—681.5 |
| 2,386,356 | 10/1945 | Schulze et al. | 260—681.5 |
| 2,386,357 | 10/1945 | Schulze et al. | 260—681.5 |
| 2,386,379 | 10/1945 | Wolk | 260—681.5 |
| 2,386,734 | 10/1945 | Wolk | 260—681.5 |
| 2,973,396 | 2/1961 | Atkinson et al. | 260—681.5 |
| 3,340,004 | 9/1967 | Hunter et al. | 260—681.5 |
| 3,348,908 | 10/1967 | Long et al. | 260—681.5 |

DELBERT E. GANTZ, *Primary Examiner.*

G. E. SCHMITKONS, *Assistant Examiner.*